United States Patent [19]

Henry et al.

[11] 4,092,854
[45] June 6, 1978

[54] MULTI-AXIS LOAD CELL

[75] Inventors: James L. Henry; Carl F. Ruoff, Jr., both of Dayton, Ohio

[73] Assignee: The Bendix Corporation, Southfield, Mich.

[21] Appl. No.: 789,032

[22] Filed: Apr. 20, 1977

Related U.S. Application Data

[63] Continuation of Ser. No. 615,852, Sep. 23, 1975, abandoned.

[51] Int. Cl.² .............................................. G01L 5/16
[52] U.S. Cl. ................................................... 73/133 R
[58] Field of Search ......................... 73/133 R, 141 A

[56] References Cited

U.S. PATENT DOCUMENTS

| 2,782,636 | 2/1967 | Peucker | 73/133 R X |
|---|---|---|---|
| 3,272,006 | 9/1966 | Eckard | 73/141 A |
| 3,309,922 | 3/1967 | Green | 73/141 A |
| 3,377,849 | 4/1968 | Lebow | 73/134 |
| 3,780,573 | 12/1973 | Reus | 73/133 R X |
| 3,939,704 | 2/1976 | Zipin | 73/133 R |

Primary Examiner—Charles A. Ruehl
Attorney, Agent, or Firm—J. R. Benefiel; K. A. Seaman; R. J. Eifler

[57] ABSTRACT

A multi-axis load cell of the type adapted to generate signals corresponding to each of the various force and moment components exerted on the load cell is disclosed, comprised of a hub and a housing interconnected by three flexure arms, each flexure arm fixed at one end to one of the hub or housing and at the other end to a beam flexure element fixed to the other of the hub or housing. Each flexure beam is designed to be readily deflected in directions aligned with its respective flexure arm but offers substantially greater resistance to deflection in other directions, so that a centering bias force is provided without restricting the bending deflection of the flexure arms relied on to measure the force and moment components.

Two sets of displacement transducers are provided, each set consisting of three transducers, with the first set arranged in pinwheel fashion about the load cell axis to measure the XY displacement components and torsional about the load cell axis. The second set consists of the other three displacement transducers arranged about the load cell axis and extending in a direction parallel thereto and adapted to measure relative movement between the hub and housing corresponding to the applied forces parallel to the load cell axis and bending moments about the X and Y axes. All of these transducers are disposed with their engagement tip in a common plane to minimize cross-influencing created by combined loadings.

8 Claims, 4 Drawing Figures

MULTI-AXIS LOAD CELL

This is a continuation, of application Ser. No. 615,852, filed Sept. 23, 1975, now abandoned.

BACKGROUND OF THE INVENTION

1. Field of the Invention

This invention concerns force measuring load cells, and more particularly, load cells adapted to resolve and measure all of the force and bending moment components capable of being exerted thereon.

2. Description of the Prior Art

Multi-axial load cells in which the components of multi-axial forces and moments may be resolved have commonly utilized crossing beam elements which have strain gages affixed thereto which are placed in bending by the various loads, which deflection is measured by the strain gages to measure the load applied thereto. In most of these load cells the crossing beams are fixed at both ends and a disadvantage of this arrangement is thereby created by the tension-compression loading of the beams not oriented so as to be in bending since the load-induced deflection is thus greatly reduced.

In a prior art load cell described in a Master's Thesis entitled "Force Feedback Steering of a Tele-Operator System", by R. C. Groome, Jr., MIT Draper Laboratory Report T-575, August 1972, an arrangement has been utilized in which the cantilever beams were allowed free sliding movement in directions aligned with their axes, so that the deflection range was increased since all elements were deflected only in bending. However, the device utilized strain gages to measure such bending and strain gages are relatively limited in the range of dynamic loads which they can measure.

U.S. Pat. No. 3,939,704 issued Feb. 24, 1976 to Zipin and assigned to the same assignee as this application, a multi-axis load cell is disclosed which is capable of measuring a wide range of dynamic loads by virtue of a cantilever beam arrangement similar to that disclosed in the MIT Report referred to above, combined with LVDT displacement transducers this combination allowing accurate measurement of a wide range of force components while being capable of resolving all components of the forces and bending moments applied thereto. However, the specific embodiment disclosed in that application suffers from the disadvantage that the various LVDT transducers are susceptible to being influenced by combinations of forces and moments applied to the load cell so that inaccuracies may result or signal corrections may be required. Furthermore, the particular cantilever bar ball joints connections were of a nature that hysteresis would be a problem.

Finally, this embodiment incorporated the use of eight separate LVDT transducers to resolve the various force and moment components, while only six such transducers are inherently necessary to resolve these components, this excess thereby increasing the cost of the load cell.

Therefore, it is an object of the present invention to produce a multi-axis load cell of a type described in which cross-influencing between the various transducers is minimized, in which the hysteresis is minimized, and in which the number of displacement transducers is reduced to a minimum.

SUMMARY OF THE INVENTION

This and other objects which will become apparent upon a reading of the following specification and claims is accomplished by a load cell consisting of a housing assembly and a central hub member interconnected by three converging flexure arms, each flexure arm fixed at one end to one of the housing or hub and at the other to a readily defletable flexure beam allowing relatively slight resistance to movement between the hub and housing in a direction aligned with the flexure arm axis while offering substantially greater resistance to relative movement in other directions. Two sets of displacement transducers are provided, each set consisting of three transducers with the first set arranged in pinwheel fashion about the load cell axis to measure the XY force components and bending moments about the load cell axis. The second set consists of the other three displcement transducers arranged about the load cell axis and extending in a direction parallel thereto and adapted to measure relative movement between the hub and housing corresponding to the applied forces parallel to the load cell axis and bending moments about the X and Y axes. All of these transducers are disposed with their engagement tip in a common plane to minimize cross-influencing created by combined loadings.

DETAILED DESCRIPTION

Figure 1:
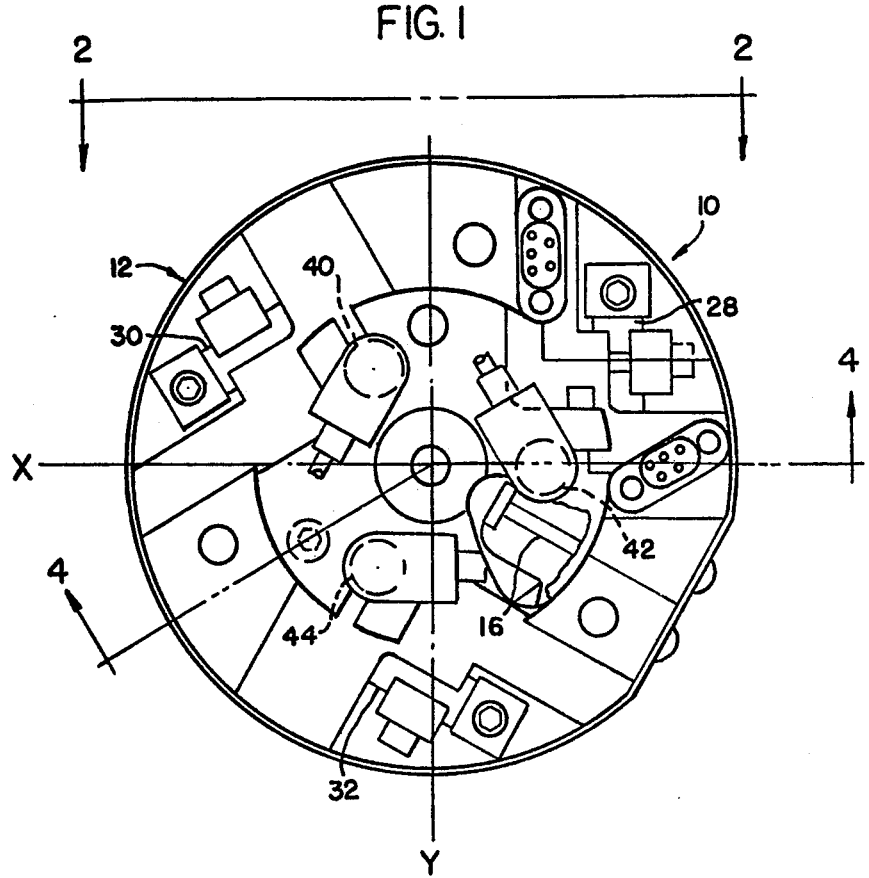
FIG. 1 is a top plan view of a load cell according to the present invention.
Figure 2:
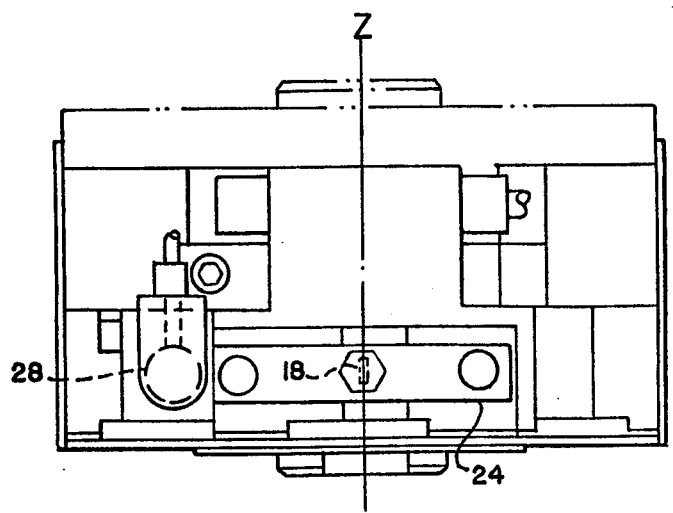
FIG. 2 is an elevational view of a load cell in FIG. 1 viewed in the direction of the arrows 2—2 in FIG. 1.

In the following specification and claims, certain specific terminology will be resorted to for the purpose of clarity but it is to be understood that this terminology is not necessarily limiting to the invention but many forms and embodiments of the invention are possible.

Also in referring herein to the various force components, the symmetry axis of the load cell will be referred to as the Z-axis, while the axes orthogonal to the "Z-axis" and to each other are referred to as the "X-Y" axes.

Referring to the drawings, the load cell 10 consists of a housing assembly 12 and a hub member 14 disposed centrally within the housing assembly 12. Means are provided drivingly connecting the housing assembles 12 and the hub 14, including three flexure arms 16, 18 and 20, arranged to converge on the load cell axis. Each flexure arm 16, 18 and 20 is affixed at one end to the hub member 14 and the other end is affixed to a respective flexure beam 22, 24 and 26 at a point on each respective flexure beam 22, 24 or 26 intermediate the length thereof.

Each of the flexure beams 22, 24 and 26 is a thin metallic element (i.e., 0.018 inch shim stock) fastened at its ends to the housing assembly 12 so as to readily deflect at its center to provide means for creating relatively slight resistance to relative movement between each flexure arm 16, 18 and 20 and the housing assembly in a direction along the axis of the respective flexure arm compared with the substantially greater resistance to such relative movement in other directions. Thus, this slight resistance provides a recentering bias force on the flexure arm due to deflection in response to the application of any X-Y component aligned with the flexure axis without significantly interfering with the bending of the other two flexure arms, which bending is relied on to measure X-Y forces or without interfering with bending thereof induced by the component of the applied load. Each flexure beam 22, 24 and 26 thus provides a centering bias force which reliably repositions the hub 14 and housing assembly 12 relative each other to thereby minimize the hysteresis effects discussed above.

Transducer means are provided for measuring the relative displacement between the hub 14 and the housing assembly 12 created by bending of the flexure arms 16, 18 and 20 under load and for generating signals corresponding thereto in order to determine the magnitude of the load that is transmitted through the load cell 10. The transducer means includes two sets of LVDT (linear variable differential transformer) displacement transducers.

Figure 3:
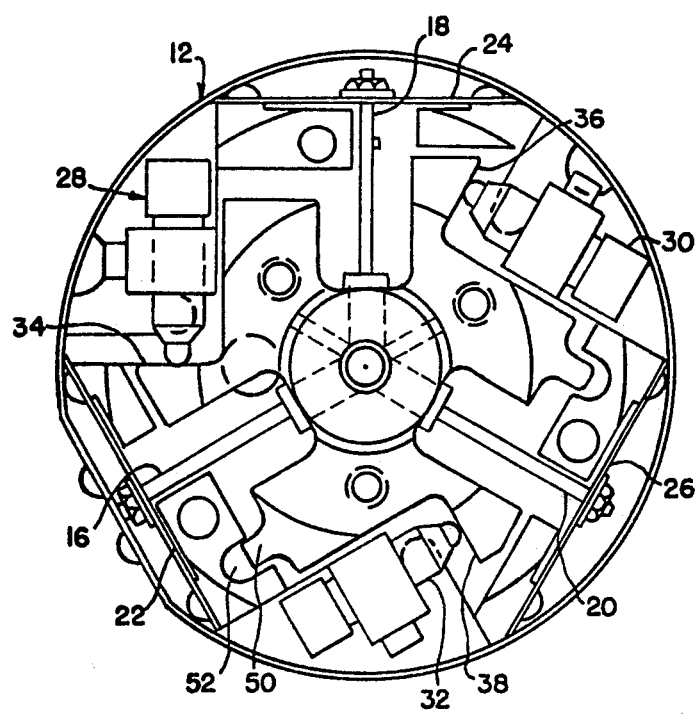
FIG. 3 is a bottom plan view of the load cell shown in FIG. 1 rotated to the right as viewed in FIG. 1 with the bottom cover removed.

A first set of three LVDT transducers 28, 30 and 32 are fixed to the housing assembly 12. The transducers 28, 30 and 32 are disposed in pinwheel fashion about the load cell symmetry axis, identified in FIG. 3 as the Z axis, engaging surfaces 34, 36 and 38, respectively, which are formed on the hub member 14. As will be appreciated by those skilled in the art, these three displacements are mathematically related to the X and Y force components experienced by the load cell 10, as well as the bending moment exerted about the Z axis.

A second set of LVDT transducers is provided, mounted to the housing assembly 12, consisting of three LVDT transducers 40, 42 and 44 extending parallel to the Z or load cell axis, engaging an annular surface 46 formed on the hub 14 which surface is located to pass precisely through the center line 48 of the LVDT transducers 28, 30 and 32 so as to minimize or eliminate the cross-influencing of the respective transducer sets created by combined force and moment loading. The LVDT transducers 40, 42 and 44 measure relative displacements between the hub and housing created by forces transmitted by the load cell with components along the Z axis and bending moment components about the X and Y axis so that taken with the previously described LVDT transducer set X, Y and Z force components may be resolved as well as bending moments about each of the X, Y and Z axes.

Overload protection is afforded by protuberances 50 formed on the hub 14 disposed in sockets 52 formed in the housing assembly 12 and variations in the clearances, the overload level can be adjusted to suit the particular application.

Figure 4:
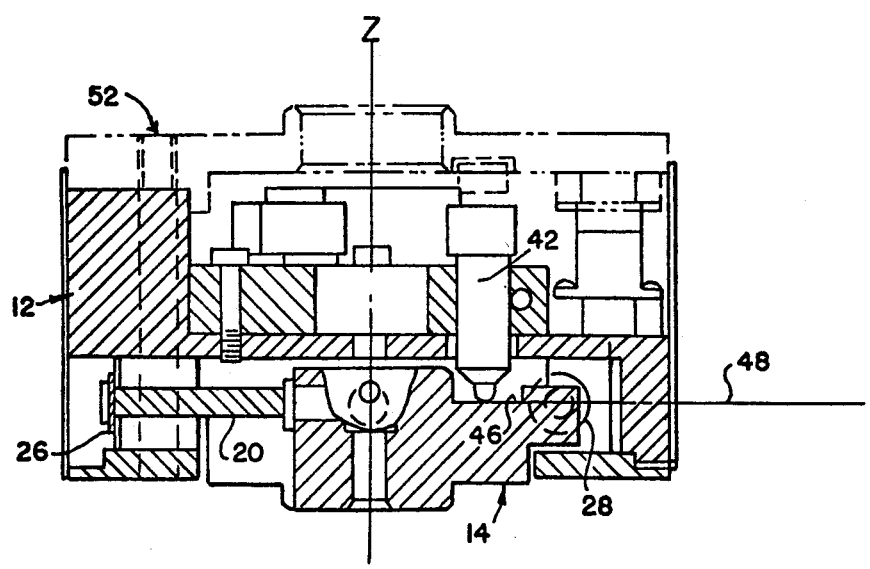
FIG. 4 is a view of the section taken along lines 4—4 in FIG. 1.

In use, the load cell would be installed with the housing assembly 12 being mounted, as by means of a flange 52 shown in phantom in FIG. 4, to one element of the force transmitting structure (not shown) and the hub 14 being secured to the other member of the force load transferring structure of the particular apparatus utilizing the device.

The resistance characteristics of the load cell can be varied by replacing the flexure beams 22, 24 and 26 with beams in which the ratio of thickness to width varies, to thereby allow changing the overall stiffness of the load cell, as well as to control the stiffness relationship between the various linear and angular force components.

It will be appreciated that the above described objects of the invention have been attained by this arrangement, specifically the alignment of all of the transducer engagement tips within a common plane has minimized the cross-influencing of combined load signals. The use of the beam flexures to connect the flexure arms with the housing assembly 12 minimizes the hysteresis of the device. Finally, the number of transducers is reduced to the minimum required in order to resolve the X, Y and Z forces and bending moments about the X, Y and Z axes.

What is claimed is:

1. A multi-axis load cell comprising:
   a housing assembly;
   a hub member disposed in said housing assembly;
   means for drivingly connecting said housing assembly and said hub member for relative displacement therebetween, said means including a plurality of flexure arms extending between said housing assembly and said hub member, said means including means fixing each of said flexure arms at one end to one of said housing assembly and said hub member;
   said means drivingly connecting said housing assembly and said hub member also including flexure means mounting each of said flexure arms to the other of said housing assembly and said hub member, said flexure means readily deflecting to allow relative movement between each flexure arm and said other of said housing assembly or said hub member in a direction along the respective axis of each flexure arm while providing substantially greater resistance to relative movement in other directions; and
   transducer means for measuring the relative displacement between said housing assembly and said hub member and generating signals corresponding thereto, said transducer means engaging one of said housing assembly and said hub member and fixed to the other, whereby the load exerted through the flexure arms may be determined.

2. The load cell of claim 1 wherein said flexure means includes a plurality of flexure beams, each flexure beam affixed to a respective flexure arm at a point intermediate the length of said respective flexure beam, said flexure means also includes means fastening said respective flexure beams near their ends to said other of said housing assembly and hub member.

3. The load cell of claim 2 wherein said flexure beams are thin metallic elements.

4. The load cell of claim 1 wherein said transducer means includes a first set of said displacement transducers arranged in pin wheel fashion about a load cell axis and also includes a second set of said displacement transducers extending parallel to and about said load cell axis.

5. The load cell of claim 4 wherein said first and second set of displacement transducers comprise three displacement transducers in each set.

6. The load cell of claim 1 wherein the flexure arms are bendable in two perpendicular directions, each direction also perpendicular to the axis of the flexure arm, whereby loads exerted on the flexure arm in the direction of the flexure arm axis result in deflecting movement of the flexure means without bending of the flexure arms and loads in any direction perpendicular to the flexure arm axis result in bending of the flexure arms without movement of the flexure arms.

7. A multi-axis load cell comprising:

a housing assembly;

a hub member disposed in said housing;

means drivingly connecting said housing assembly and said hub member, including a plurality of flexure arms extending between said housing assembly and said hub member, said means including means fixing each of said flexure arms near one end to one of said housing assembly and said hub member;

said means drivingly connecting said housing assembly and said hub member also including a plurality of flexure beams affixed to a respective flexure arm and to the other of said housing assembly and said hub member, each of said flexure beams readily deflecting to allow relative movement between its respective flexure arm and said other of said housing assembly and said hub member in a direction along the respective axis of the flexure arm while providing substantially greater resistance to relative movement in other directions; and transducer means measuring the relative displacement between said housing assembly and said hub member and generating signals corresponding thereto, whereby the load exerted through said flexure arms may be determined, where said transducer means includes a first set of displacement transducers arranged in pin wheel fashion about a load cell axis and a second set of displacement transducers extending parallel to and about said load cell axis, where all of the displacement transducers in said first and second sets are fixed to one of said hub member and said housing assembly and engage the other of said hub member and housing assembly at points thereon in a substantially common plane.

8. A load cell comprising:

a housing;

a hub disposed within the housing;

a means for connecting the hub and the housing for relative movement therebetween including:

a plurality of bending arms extending between said housing and said hub, each of said bending arms fixed at one end thereof to one of said housig and said hub; and a plurality of deflectable members, each deflectable member coupled at each end to the other of said housing and said hub and medially coupled to the other end of one of said bending arms, each of said deflectable members movable in a direction along the axis of the bending arm to which it is coupled, said deflectable member being substantially nonmovable in other directions; and transducer means for measuring movement between said housing and said hub and generating signals corresponding thereto, including a first set of transducers, each transducer having an axis in a common plane, said plane perpendicular to the hub axis, and each transducer engaging a first surface carried by the one of said housing and hub, said transducer means further including a second set of transducers, with each transducer in the second set having an axis transverse to the axes of the transducers in the first set and engaging a second surface in said common plane.

* * * * *